(12) United States Patent
Chen et al.

(10) Patent No.: US 10,387,187 B2
(45) Date of Patent: Aug. 20, 2019

(54) SAVING DATA FOR VIRTUAL MACHINE (VM) SESSIONS UPON UPDATE OF HOST OPERATING SYSTEM

(71) Applicant: VMware, Inc., Palo Alto, CA (US)

(72) Inventors: Zhikai Chen, Beijing (CN); Zhibin He, Beijing (CN); Xi Chen, Beijing (CN); Wen Wang, Beijing (CN)

(73) Assignee: VMware, Inc., Palo Alto, CA (US)

( * ) Notice: Subject to any disclaimer, the term of this patent is extended or adjusted under 35 U.S.C. 154(b) by 222 days.

(21) Appl. No.: 15/644,412

(22) Filed: Jul. 7, 2017

(65) Prior Publication Data

US 2019/0012192 A1 Jan. 10, 2019

(51) Int. Cl.
*G06F 9/44* (2018.01)
*G06F 9/455* (2018.01)
*G06F 9/4401* (2018.01)

(52) U.S. Cl.
CPC ........ *G06F 9/45558* (2013.01); *G06F 9/4401* (2013.01); *G06F 9/4406* (2013.01); *G06F 2009/45562* (2013.01); *G06F 2009/45575* (2013.01)

(58) Field of Classification Search
CPC ....... G06F 9/45558; G06F 2009/45575; G06F 21/31
See application file for complete search history.

(56) References Cited

U.S. PATENT DOCUMENTS

| | | | | |
|---|---|---|---|---|
| 9,864,609 B1* | 1/2018 | McClure | ............... | G06F 9/4418 |
| 2003/0236972 A1* | 12/2003 | Harrington | ........... | G06F 9/5077 |
| | | | | 713/2 |
| 2010/0107241 A1* | 4/2010 | Jaber | ...................... | G06F 21/31 |
| | | | | 726/18 |

* cited by examiner

*Primary Examiner* — Albert Wang

(74) *Attorney, Agent, or Firm* — Patterson + Sheridan, LLP

(57) ABSTRACT

A method of rebooting a computing system in which a virtual machine (VM) runs on top of a hypervisor and a host operating system (OS) includes the following steps. Those steps are sending, from the host OS to the hypervisor, a pre-reboot notification that the host OS is going to reboot, in response to reception of the pre-reboot notification, saving by the hypervisor state of a session that is executing in the VM, rebooting the host OS, after the host OS is rebooted, logging on to the host OS using a credential provider that was previously registered with the host OS and sending a post-reboot notification from the host OS to the hypervisor, and in response to reception of the post-reboot notification, instantiating by the hypervisor a VM in which the session is resumed using the saved state of the session.

20 Claims, 2 Drawing Sheets

SAVING DATA FOR VIRTUAL MACHINE (VM) SESSIONS UPON UPDATE OF HOST OPERATING SYSTEM

BACKGROUND

In one type of a computing system on which one or more virtual machines (VM) run, a host operating system (OS) is installed, and a hypervisor, which manages the virtual machines, runs on top of or in conjunction with the host OS. The computing system of this type is typically utilized when the computing system is used for purposes other than hosting virtual machines, including running applications directly on top of the host OS.

The host OS may need to reboot for various reasons, such as update of the host OS, installation or update of application software, troubleshooting, addition or update of another hypervisor, and so on. When the host OS reboots, since the power of the computing system is shut off, the hypervisor running on the computing system is forced to close and therefore all sessions that are executing on the virtual machines are forced to stop and thus setting data for the sessions are lost. For that reason, it is desirable to configure the hypervisor so as to maintain the session on virtual machines even across host OS rebooting.

SUMMARY

One or more embodiments provide a method of rebooting a computing system in which a virtual machine (VM) runs on top of a hypervisor and a host operating system (OS). The method includes the steps of sending, from the host OS to the hypervisor, a pre-reboot notification that the host OS is going to reboot, in response to reception of the pre-reboot notification, saving by the hypervisor state of a session that is executing in the VM, rebooting the host OS, after the host OS is rebooted, logging on to the host OS using a credential provider that was previously registered with the host OS and sending a post-reboot notification from the host OS to the hypervisor, and in response to reception of the post-reboot notification, instantiating by the hypervisor a VM in which the session is resumed using the saved state of the session.

Further embodiments include a non-transitory computer-readable storage medium storing instructions that, when executed by a computer system, cause the computer system to perform at least part of the method set forth above, and a computer system programmed to carry out the method set forth above.

DETAILED DESCRIPTION

Reference will now be made in detail to several embodiments, examples of which are illustrated in the accompanying figures. It is noted that wherever practicable similar or like reference numbers may be used in the figures and may indicate similar or like functionality. The figures depict embodiments for purposes of illustration only. One skilled in the art will readily recognize from the following description that alternative embodiments of the structures and method illustrated herein may be employed without departing from the principles described herein.

Figure 1:
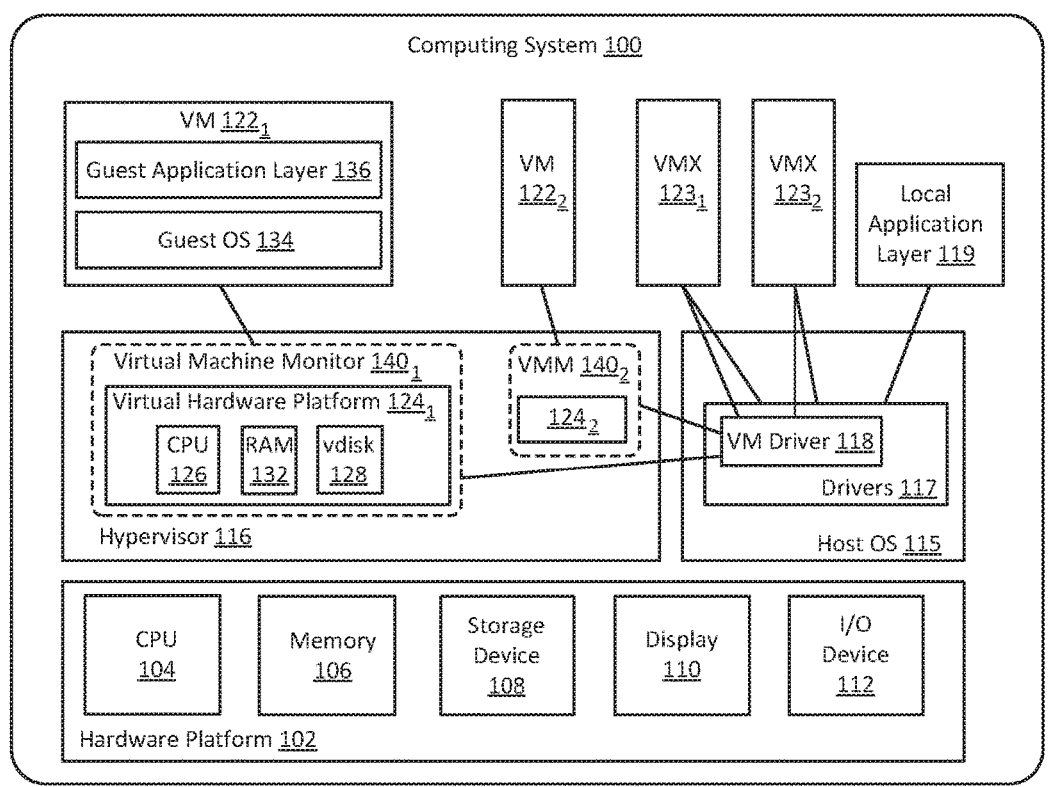
FIG. 1 depicts a block diagram of a computing system according to an embodiment, on which one or more virtual machines run.

FIG. 1 depicts a block diagram of a computing system 100 that is capable of emulate one or more virtual machines (VMs). The computer system 100 may be constructed on a desktop, laptop, or server grade hardware platform 102 such as an x86 architecture platform. The hardware platform 102 includes a central processing unit (CPU) 104, a memory 106, a storage device 108 (e.g., a hard drive and a solid state drive), a display 110, and an I/O device 112 (e.g., a mouse and keyboard). The CPU 104 may be a multi-core processor which can operate concurrently and can read and write data to the memory 106.

A host operating system (OS) 115 is installed on top of the hardware platform 102. The host OS 115 has drivers 117 for controlling and communicating with the elements of the computing system 100, mainly, the hardware platform 102. The host OS 115 is not limited to a specific type, and may be any operating system, including Microsoft Windows®, Linux®, macOS, and so on. On top of the host OS 115, a local application layer 119 that is installed and includes arbitrary software (e.g., Microsoft Word® and Microsoft Edge®) runs locally. Further a virtualization software layer, also referred to hereinafter as a hypervisor 116, is installed so as to operate in conjunction with the host OS 115. One example of the hypervisor 116 that may be used is included as a component of VMware's Workstation™ product or VMware's Workstation Player™, which are commercially available from VMware, Inc. of Palo Alto, Calif.

The host OS 115 and the hypervisor 116 both may be installed at a system level, and therefore the host OS 115 and the hypervisor 116 can independently modify the state of the components of the hardware platform 102. Specifically, the host OS 115 interacts directly with elements of the hardware platform 102. On the other hand, the hypervisor 116, in general, indirectly accesses the hardware platform 102 through operations of the host OS 115, but for some operations may interact directly with elements of the hardware platform 102. That is, the hypervisor 116 serves as a type-2 (or hosted) hypervisor, which is different from a type-1 (or native, bare-metal) hypervisor, which does not require any host OS.

In the embodiment depicted herein, the virtualization execution environment is provided through both a user mode process executing in a less privileged state, referred to as the VMX process (e.g., VMX processes $123_1$-$123_2$) running on top of the host OS 115 and a virtual machine monitor (VMM) executing in a more privileged state (e.g., VMM $140_1$-$140_2$). Each VM 122 effectively executes in the process space of its respective VMX process 123 (i.e., its memory is mapped to each respective VMX process).

In addition, for each VM 122, the hypervisor 116 manages a corresponding virtual hardware platform (i.e., virtual hardware platforms $124_1$-$124_2$ implemented in VMMs $140_1$-$140_2$, respectively) that includes emulated hardware elements such as a virtual CPU 126, a virtual disk (vdisk) 128, and a virtual RAM 132. For example, the virtual hardware platform $124_1$ may function as an equivalent of a standard x86 hardware architecture, such that any x86 supported operating system, e.g., Microsoft Windows®, Linux®, Solaris® x86, NetWare, FreeBSD, etc., may be installed as a guest operating system (OS) 134 to execute any supported applications in a guest application layer 136 for the VM $122_1$. It is noted that in the present embodiment, the guest OS 134 is of the same type as the host OS 115 but in other embodiments may be a different type from the host OS 115. The guest OS 134 of the VM $122_1$ includes device drivers (e.g., pre-existing device drivers available for the guest OS 134 etc.) that interact with emulated hardware elements in the virtual hardware platform $124_1$ as if such emulated hardware elements were actual physical devices.

To communicate with physical devices of the hardware platform 102, the VMM 140 issue requests via the host OS 115. To make this possible, a special driver, VM driver 118, is installed as any other driver within the host OS 115 and exposes a standard API to the VMX process 123. When the system is in the VMM context, meaning that the VMM is taking exceptions, handling interrupts, etc., but the VMM wishes to use the existing I/O facilities of the host OS 115, the VMM calls the VM driver 118, which then issues calls to the VMX process 123, which then carries out the I/O request by calling the appropriate routine in the host OS 115.

It should be recognized that the various terms, layers, and categorizations used to describe the virtualization components in FIG. 1 may be referred to differently without departing from their functionality or the spirit or scope of the invention. For example, the virtual hardware platforms $124_1$-$124_2$ may be considered to be part of the virtual machine monitors (VMM) $140_1$-$140_2$ which implement the virtual system support needed to coordinate operations between the hypervisor 116 and their respective VMs. Alternatively, the virtual hardware platforms $124_1$-$124_2$ may also be considered to be separate from the VMMs $140_1$-$140_2$, and the VMMs $140_1$-$140_2$ may be considered to be separate from the hypervisor 116. It should further be recognized that other virtualized computer system architectures may be used consistent with the teachings herein, such a shared storage array network (SAN) that is shared among various virtualized computer systems (e.g., clusters) in order to store virtual hard drives such as the hard drive 128. Further, it should be recognized that the number of VMs 122 that run on the computing system 100 is not particularly limited, and any number of VMs 122 can be emulated.

In addition, the embodiments described above employ a hardware abstraction layer installed on top of the host OS 115. The hardware abstraction layer allows multiple contexts or virtual computing instances to share the hardware resource. In one embodiment, these virtual computing instances are isolated from each other, each having at least a user application running therein. The hardware abstraction layer thus provides benefits of resource isolation and allocation among the virtual computing instances. In the foregoing embodiments, the virtual machines (VMs) 122 are used as an example for the virtual computing instances and the hypervisor 114 as an example for the hardware abstraction layer. As described above, each virtual machine 122 includes a guest OS 134 in which at least one application runs. It should be noted that these embodiments may also apply to other examples of virtual computing instances, such as containers not including a guest OS, which is referred to as "OS-less containers."

In the computing system 100, the host OS 115 may need to be rebooted for various reasons, such as update of the host OS 115, installation or update of application software in the local application layer 119, troubleshooting, addition or update of another hypervisor, and so on. In some operating systems, such a reboot is automatically started upon a predetermined condition being met, even without user instructions. When the reboot of the host OS 115 starts, all sessions (e.g., the guest application layer 136 and the guest OS 134) of the VMs 122 are stopped. In this case, virtual machine disk files (VMDK) of each of the VMs 122 stored in the vdisk 128 (in reality stored in the storage device 108) remain intact, because the VMDK files are stored therein in a non-volatile manner. However, data stored in the RAM 132 (in reality stored in the memory 106), which typically include all unsaved (volatile) session data of the sessions of the VMs 122 will be lost. Further, because of the loss of the session data, the hypervisor 116 may not be able to restore the interrupted sessions, especially, to the state of the sessions right before the reboot occurs. It is noted that the "reboot" used here may include a cold reboot, which involves the computing system 100 restarts from a power-less state, and a warm reboot, which the computing system 100 restarts without the need to interrupt power thereof.

According to an embodiment, when the host OS 115 is rebooted, the hypervisor 116 saves the session data of the VMs 122. For the hypervisor 116 to recognize that the host OS 115 is going to reboot, the host OS 115 is configured to provide a notification of reboot before the reboot starts (hereinafter, pre-reboot notification). The pre-reboot notification may be a push notification or a pull notification. That is, the host OS 115 may be set to provide a push notification with any inquiry from the hypervisor 116 or provide a pull notification in response to an inquiry from the hypervisor 116. The pre-reboot notification may be provided at a predetermined timing before the host OS 115 starts rebooting, and may indicate a specific time at which the host OS 115 starts rebooting or a remaining time period before the reboot starts. Further, when the pre-reboot notification is a pull notification, the hypervisor 116 may send an inquiry every predetermined interval, or every time any status update of the sessions occurs. For example, when the host OS 115 is Microsoft Windows 10, the hypervisor 116 registers for the pre-reboot notification from the host OS 115 in advance using an API, and the host OS 115 so registered provides the pre-reboot notification at a predetermined timing before the reboot starts.

The hypervisor 116, in response to the pre-reboot notification, pauses all sessions of the VMs 122 running thereon. That is, the hypervisor 116 prevents the state of the sessions from being changed once the pre-reboot notification is provided from the host OS 115. Then, the hypervisor 116 carries out a backup operation of saving the session data of the VMs 122 in the RAM 132 into the corresponding vdisks 128 of the corresponding virtual hardware platforms 124, which, in reality, causes the session data in the system memory 106 to be saved in the storage device 108 or any other nonvolatile storage device within the computing system 100 or outside thereof connected through a network.

The manner of the backup operation is not limited, and the backup operation may be carried out in any suitable manner. In an embodiment, the backup operation may involve saving one or more snapshots (i.e., copy of the session data at a given point in time) of the VMs 122 that were taken by the hypervisor 116. After the backup operation is carried out, the hypervisor 116 may return an acknowledgement to the host OS 115, such that the host OS 115 can recognize completion of the backup operation and start rebooting. In another embodiment, the hypervisor 116 does not provide the acknowledgement to the host OS 115, in which case the host OS 115 may assume that the hypervisor 116 completes the backup operation a predetermined time after the host OS 115 sends the pre-reboot notification.

When the host OS 115 reboots, a user logon to the host OS 115 may be required. In this case, a user may manually logon to the host OS 115. In the alternative, in some types of operating systems, the user logon can be carried out automatically, i.e., without user's manual operation of the computing system 100, provided that a "credential provider" is registered in advance to the host OS 115. As used herein, the credential provider is a mechanism for user authentication that is carried out to prove the user's identity in connection with user logon and other system authentication scenarios. The credential provider includes a system credential provider (such as password, PIN, smartcard, and Windows Hello (Fingerprint, Face, and Iris recognition)), and a third-party credential provider, which can be any form defined by a third party. When the credential provider is registered, as soon as the host OS 115 is rebooted, the user logon is automatically carried out using the registered credential provider, which enables a quicker user logon. After the reboot (and also a user logon, if any) of the host OS 115, the hypervisor 116 is launched and the host OS 115 provides a notification of completion of the reboot or the user logon, if any (hereinafter, post-reboot notification) to the hypervisor 116. For example, when the host OS 115 is Microsoft Windows 10, the hypervisor 116 can register for the post-reboot notification from the host OS 115 in advance using an API, and the host OS 115 so registered provides the post-reboot notification at a predetermined timing after completion of the reboot or the logon.

In response to the post-reboot notification of the completion of the reboot, the hypervisor 116 carries out a restoration operation of restoring the sessions of the VMs 122 to the states before the reboot occurred. For the restoration operation, the hypervisor 116 reconstructs (instantiates) the VMs 122 that were running before the reboot and resume the sessions by reloading the session data of the VMs 122 that were saved in the storage device 108 or any other nonvolatile storage device to the RAM 132. Alternatively, the hypervisor 116 creates (instantiates) new VMs and transfer the saved session data to newly created hard drives and newly-creased RAMs of the new VMs. Further, the restoration of a VM may include rebooting of the guest OS 134. In this case, the rebooting of the guest OS 134 for the VM 122 can be carried out in a manner similar to the one of the host OS 115. Also, the restoration of the VM 122 typically includes restoration of the guest application layer 136 that runs therein, which may be carried out using the reloaded session data.

Figure 2:
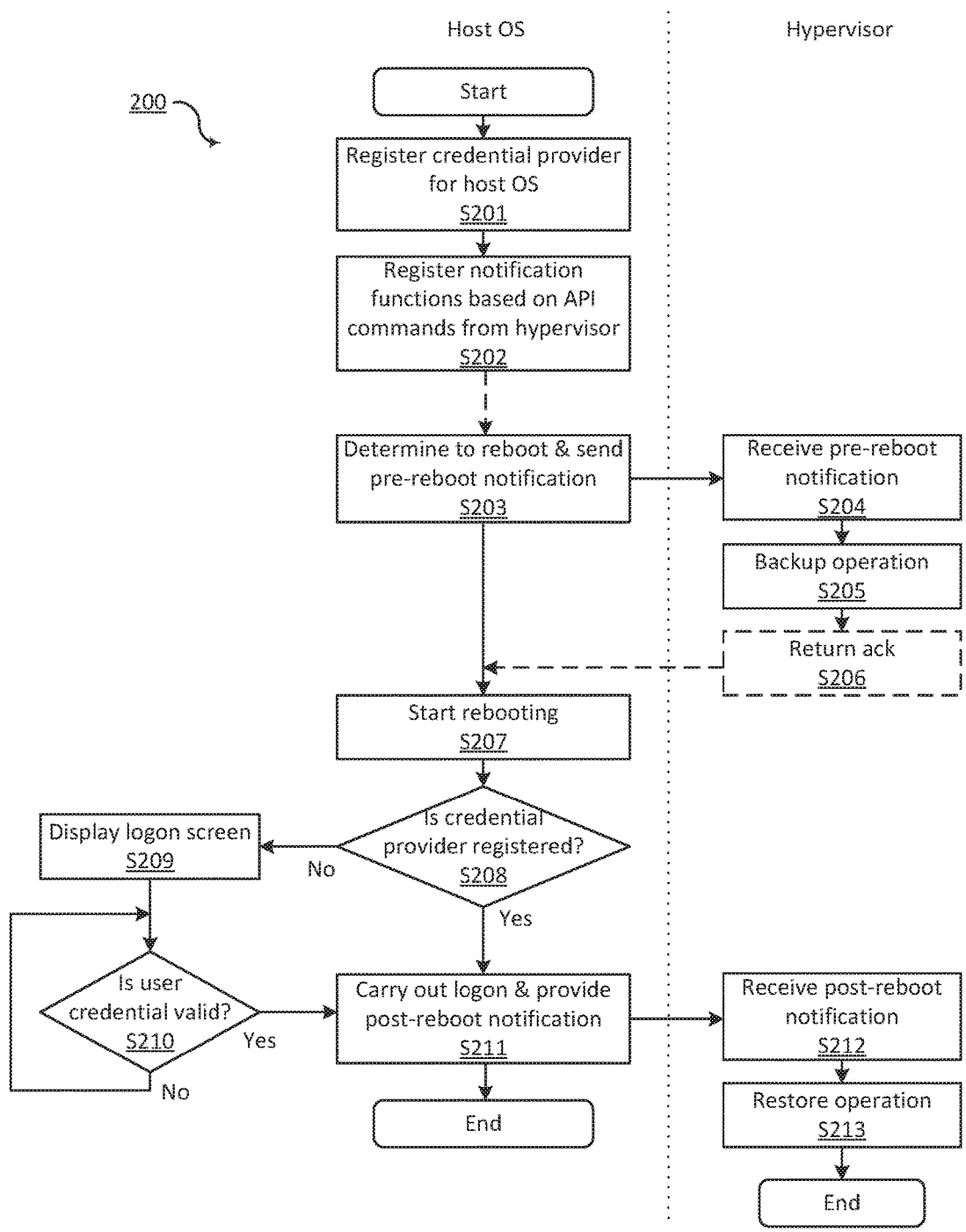
FIG. 2 depicts a flow diagram of an operation of a computing system related to reboot of a host OS.

FIG. 2 depicts a flow diagram of a method 200 of operations of the computing system 100 related to reboot of the host OS 115, in particular, operations carried out by the host OS 115 and the hypervisor 116, according to an embodiment. The method 200 starts at step S201 shown in FIG. 2, where a user of the computing system 100 registers a credential provider for the user's logon with the host 115. At step S202, the hypervisor 116, automatically or according to a user instruction, registers for the pre-reboot notification and the post-reboot notification with the host OS 115 using an API. These steps S201 and S202 may be carried out as a preparation, before any reboot of the host OS 115 occurs, and the order of the step S201 and S202 may be reversed.

At step S203, the host OS 115 determines to reboot and sends the pre-reboot notification to the hypervisor 116. As set forth above, the host OS 115 may determine to reboot, when a predetermined condition is met, or in response to a user instruction, and also the pre-reboot notification may be a pull notification or push notification, to the hypervisor 116. At step S204, the hypervisor 116 receives the pre-reboot notification. At step S205, the hypervisor 116 carries out a backup operation, which may include saving the session data of the VMs 122 in the RAM 132 into the vdisk 128, as set forth above, which, in reality, causes the session data in the memory 106 to be saved in the storage device 108 or any other storage device within or outside the computing system 100. Then, as an optional step S206, the hypervisor 116 may return an acknowledgement.

At step S207, the host OS 115 starts rebooting, a predetermined period of time after providing the pre-reboot notification, or in response to reception of the acknowledgement from the hypervisor 116. The reboot may or may not involve interruption of power to the computing system 100. At step S208, the host OS 115 determines whether or not the credential provider is registered. If the determination at step S208 is positive (Yes at step S208), the process proceeds to step S211. If the determination at step S209 is negative (No at step S208), the host OS 115 causes a user logon screen on the display 110 at step S209. Then, at step S210, the host OS 115 determines whether or not a user credential input through the I/O device 112, if any, is valid. If the determination at step S210 is negative (No at step S210), the process returns to step S210; and if the determination at step S220 is positive (Yes at step S210), the process proceeds to step S211. At step S211, the host OS 115 carries out user logon, automatically in accordance with the credential provider that is registered in advance or the user credential input by the user, and provides the post-reboot notification to the hypervisor 116. After step S211, operations on the side of the host OS 115 ends. At step S212, the hypervisor 116, which is launched after the reboot of the host operating system 116, receives the post-reboot notification. At step S213, the hypervisor 116 carries out a restore operation, which may include retrieving the saved session data, reconstructing or newly creating VMs, and resuming the sessions that were being carried out in the VMs. After step S213, operations on the side of the hypervisor 116 ends.

According to the above described reboot of the computing system 100, since the hypervisor 116 receives a pre-reboot notification before the host OS 115 reboots, the hypervisor 116 can save the session data of the VMs 122 before being lost because of the reboot. After the host OS 115 is rebooted, the hypervisor 116 can instantiate VMs and resume the sessions that were being carried out in the VMs 122, using the retrieved session data. Therefore, even when the reboot of the host OS 115 occurs, sessions of VMs can be recovered as were before the reboot and can be resumed seamlessly.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method of rebooting a computing system in which a virtual machine (VM) runs on top of a hypervisor and a host operating system (OS), the method comprising:
   sending, from the host OS to the hypervisor, a pre-reboot notification that the host OS is going to reboot;
   in response to reception of the pre-reboot notification, saving by the hypervisor state of a session that is executing in the VM;
   rebooting the host OS;
   after the host OS is rebooted, logging on to the host OS using a credential provider that was previously registered with the host OS and sending a post-reboot notification from the host OS to the hypervisor; and
   in response to reception of the post-reboot notification, instantiating by the hypervisor a VM in which the session is resumed using the saved state of the session.

2. The method according to claim 1, further comprising:
   returning an acknowledgement by the hypervisor to the host OS, upon completing an operation to save the state of the session, wherein the host OS is rebooted in response to reception of the acknowledgement.

3. The method according to claim 1, wherein
   the post-reboot notification is sent to the hypervisor in response to the logging on to the host OS.

4. The method according to claim 1, further comprising:
   registering the credential provider with the host OS; and
   registering, by the hypervisor, for the pre-reboot notification, such that the host OS sends the pre-reboot notification to the hypervisor when the host OS reboots.

5. The method according to claim 1, further comprising:
   registering, by the hypervisor, for the post-reboot notification, such that the host OS sends the post-reboot notification to the hypervisor when the host OS completes to reboot.

6. The method according to claim 1, wherein
   the state of the session is saved in a nonvolatile storage device of the computing system.

7. The method according to claim 1, wherein
   the state of the session is saved in an external storage device that is connected to the computing system through a network.

8. The method according to claim 1, wherein
   said instantiating the VM includes rebooting a guest operating system inside the VM.

9. A non-transitory computer readable medium comprising instructions to be executed in a computing system in which a virtual machine (VM) runs on top of a host operating system (OS) to cause the computing system to carry out a method of rebooting the computing system, the method comprising:
   causing the host OS to send a pre-reboot notification that the host OS is going to reboot before the host OS starts to reboot;
   in response to reception of the pre-reboot notification, saving state of a session that is executing in the VM; and
   in response to reception of a post-reboot notification that is received from the host OS after a reboot of the host OS and a logging on to the host OS using a credential provider that was previously registered with the host OS, instantiating a VM in which the session is resumed using the saved state of the session.

10. The non-transitory computer readable medium according to claim 9, wherein the method further comprises:
    returning an acknowledgement to the host OS, upon completing an operation to save the state of the session, wherein the host OS is rebooted in response to reception of the acknowledgement.

11. The non-transitory computer readable medium according to claim 9, wherein the method further comprises:
    registering for the pre-reboot notification, such that the host OS sends the pre-reboot notification when the host OS reboots; and registering for the post-reboot notification, such that the host OS sends the post-reboot notification when the host OS completes to reboot.

12. The non-transitory computer readable medium according to claim 9, wherein
the state of the session is saved in a nonvolatile storage device of the computing system.

13. The non-transitory computer readable medium according to claim 9, wherein
the state of the session is saved in an external storage device that is connected to the computing system through a network.

14. The non-transitory computer readable medium according to claim 9, wherein
said instantiating the VM includes rebooting a guest operating system inside the VM.

15. A computing system in which a virtual machine (VM) runs on top of a hypervisor and a host operating system (OS), and that is configured to carry out a method comprising:
sending, from the host OS to the hypervisor, a pre-reboot notification that the host OS is going to reboot;
in response to reception of the pre-reboot notification, saving by the hypervisor state of a session that is executing in the VM;
rebooting the host OS;
after the host OS is rebooted, logging on to the host OS using a credential provider that was previously registered with the host OS and sending a post-reboot notification from the host OS to the hypervisor; and
in response to reception of the post-reboot notification, instantiating by the hypervisor a VM in which the session is resumed using the saved state of the session.

16. The computing system according to claim 15, wherein the method further comprises:
returning an acknowledgement by the hypervisor to the host OS, upon completing an operation to save the state of the session, wherein the host OS is rebooted in response to reception of the acknowledgement.

17. The computing system according to claim 15, wherein the host OS sends the post-reboot notification to the hypervisor in response to the logging on to the host OS.

18. The computing system according to claim 15, wherein the method further comprises:
registering the credential provider with the host OS; and
registering, by the hypervisor, for the pre-reboot notification, such that the host OS sends the pre-reboot notification to the hypervisor when the host OS reboots.

19. The computing system according to claim 15, wherein the method further comprises:
registering, by the hypervisor, for the post-reboot notification, such that the host OS sends the post-reboot notification to the hypervisor when the host OS completes to reboot.

20. The computing system according to claim 15, wherein the state of the session is saved in a nonvolatile storage device of the computing system.

* * * * *